(No Model.)  6 Sheets—Sheet 1.
J. B. G. A. CANET.
CONTROLLING THE ACTION OF FLUIDS UNDER PRESSURE.
No. 425,657.  Patented Apr. 15, 1890.
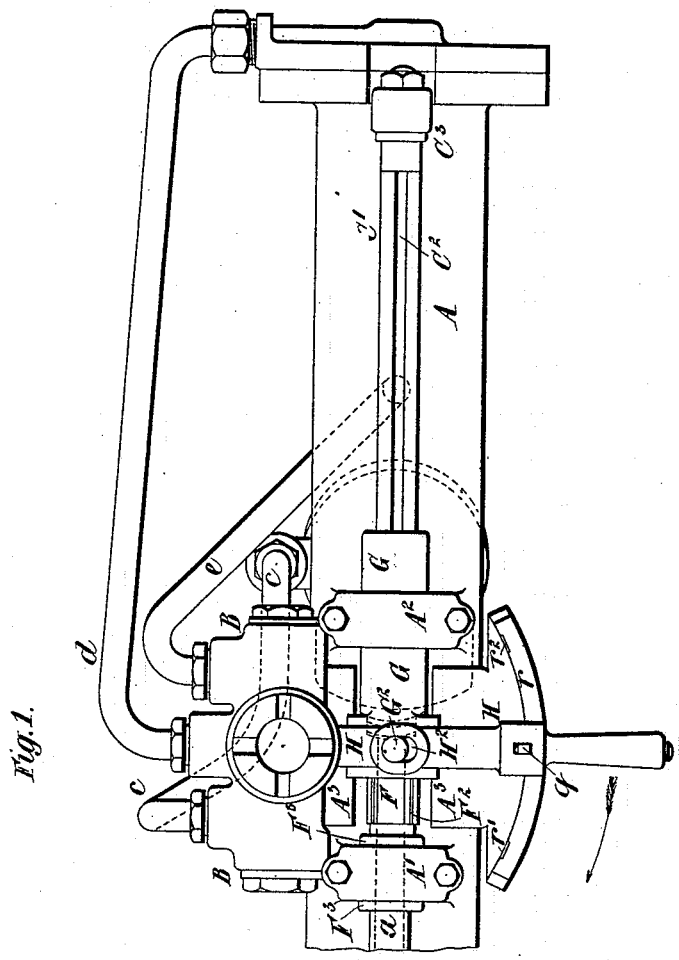
Fig. 1.
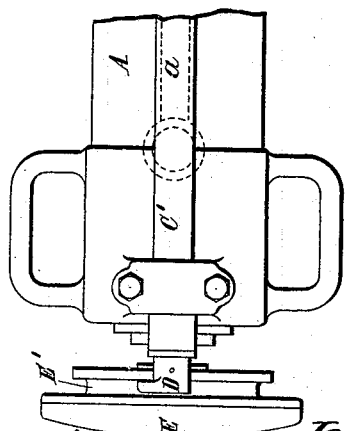
Witnesses:
J. A. Rutherford
Robert Errett
Inventor:
Jean B. G. A. Canet
By James L. Norris
Atty.

(No Model.) 6 Sheets—Sheet 2.
J. B. G. A. CANET.
CONTROLLING THE ACTION OF FLUIDS UNDER PRESSURE.
No. 425,657. Patented Apr. 15, 1890.
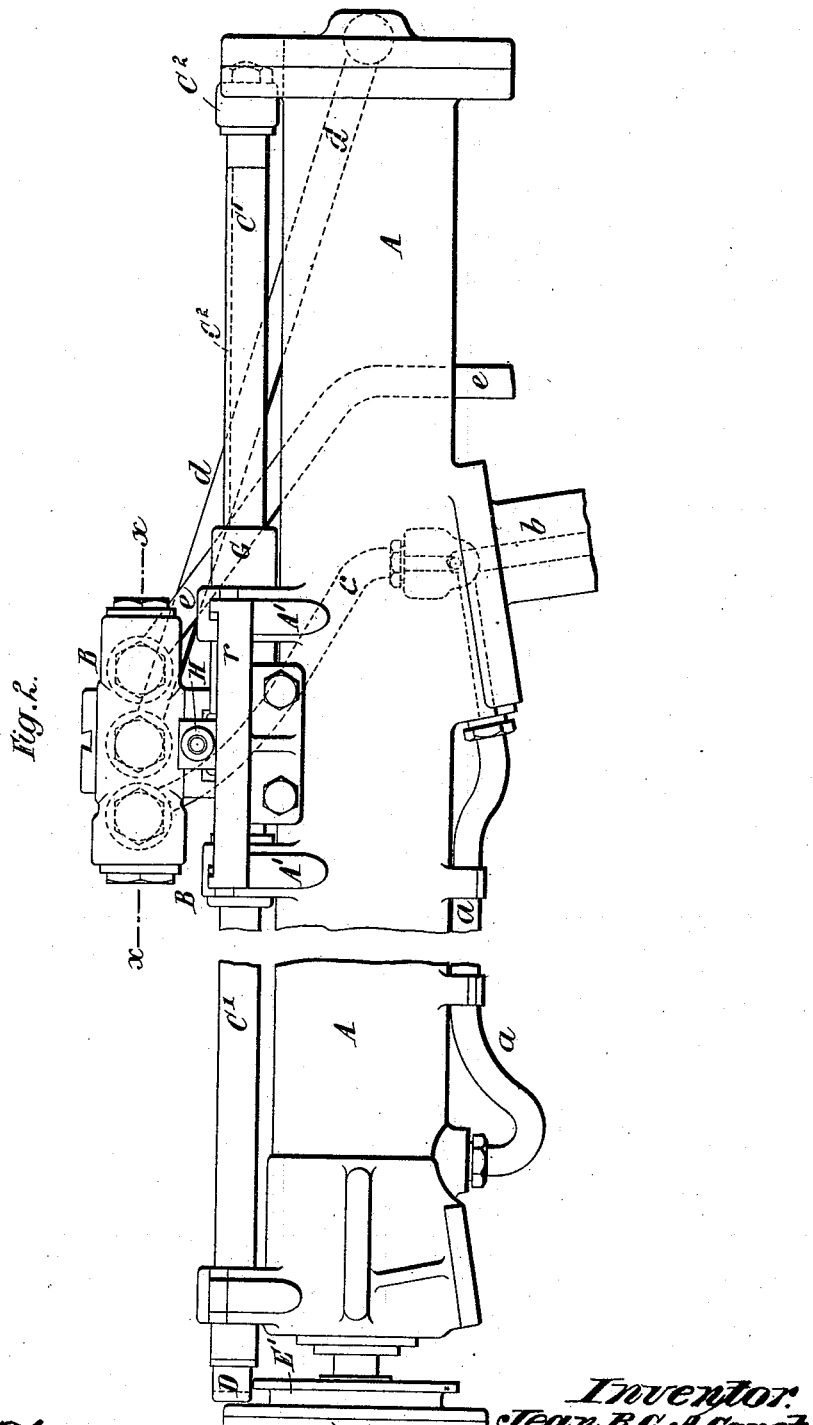

(No Model.) 6 Sheets—Sheet 3.
J. B. G. A. CANET.
CONTROLLING THE ACTION OF FLUIDS UNDER PRESSURE.
No. 425,657. Patented Apr. 15, 1890.
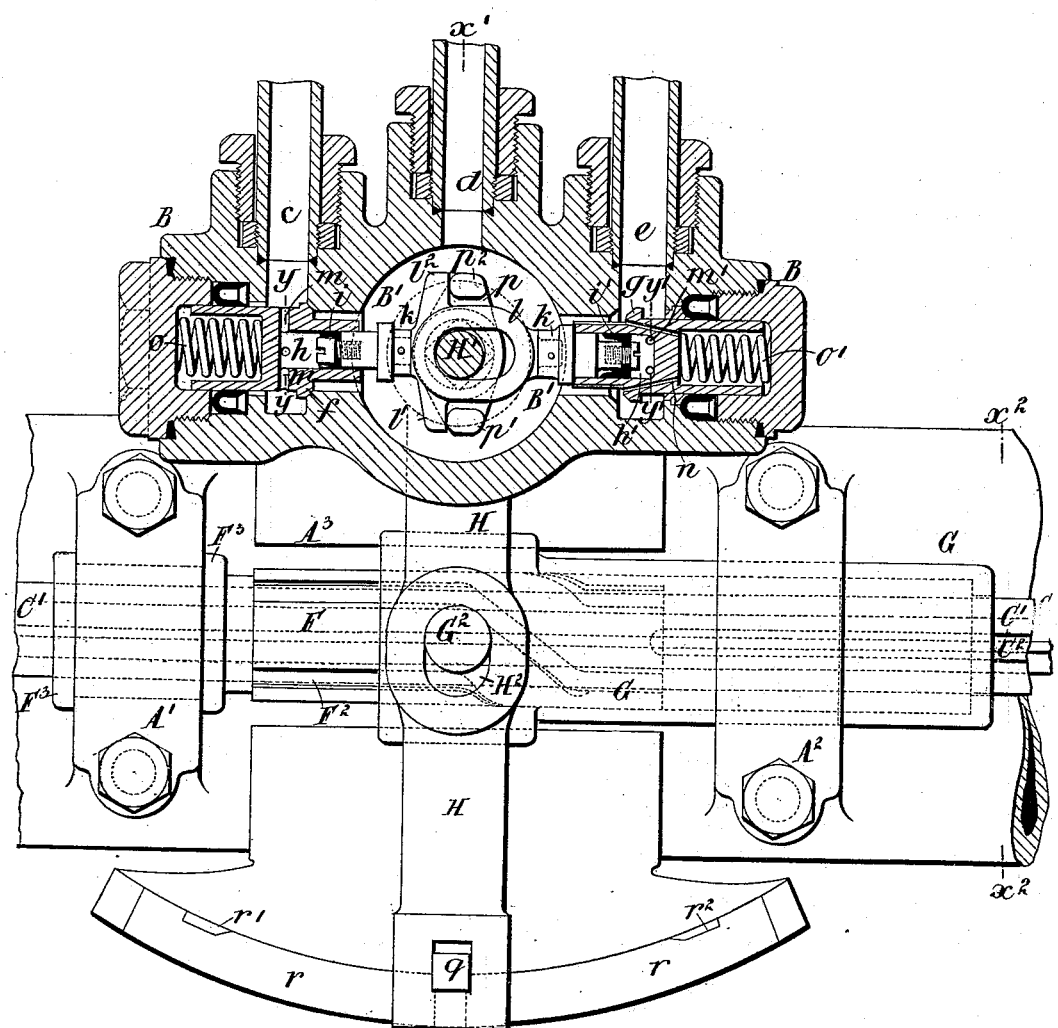
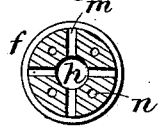
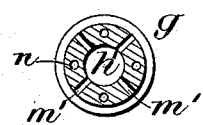
Witnesses
J. A. Rutherford
Robert Everitt
Inventor
Jean B. G. A. Canet,
By
James L. Norris,
Atty.

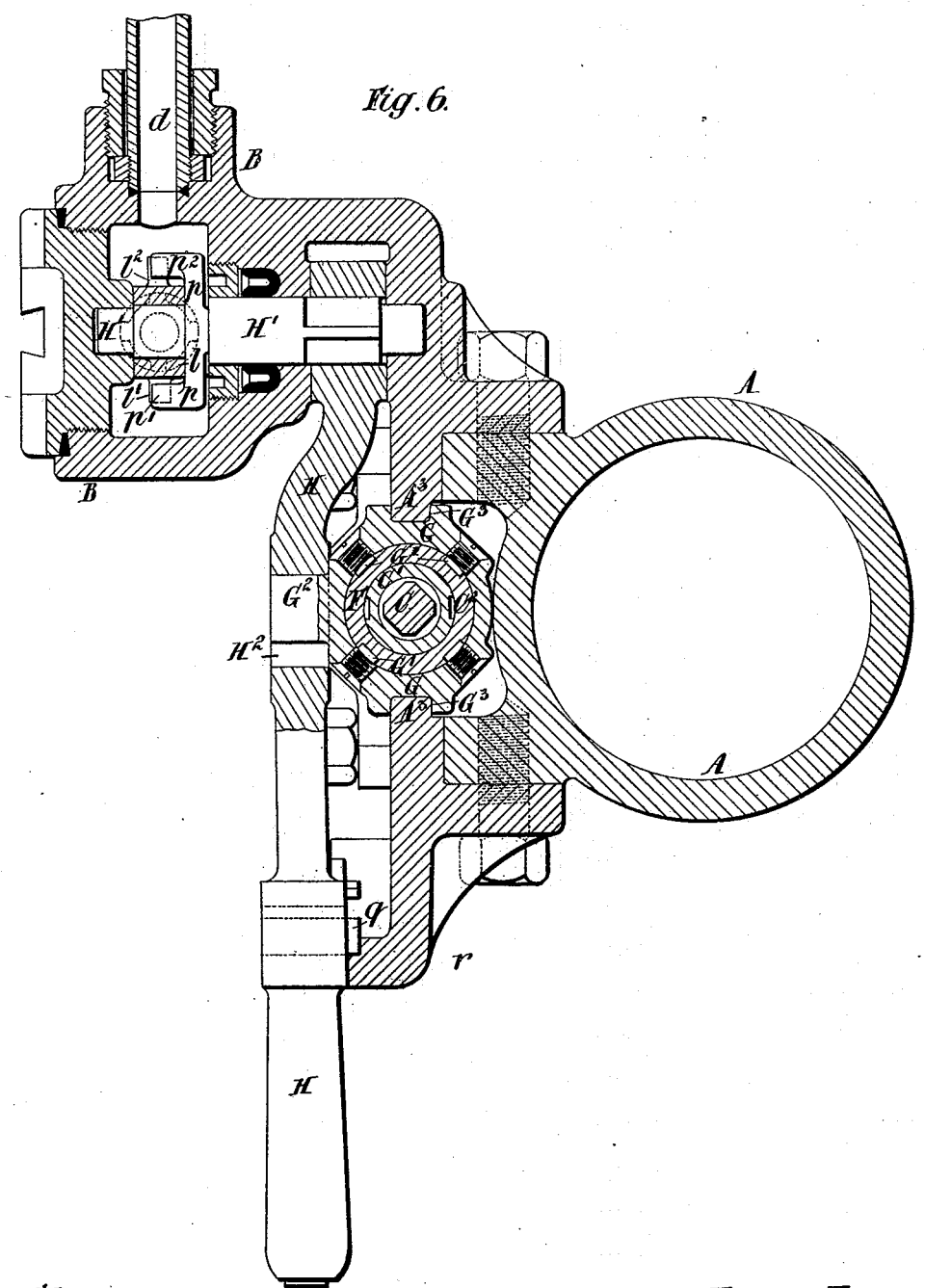

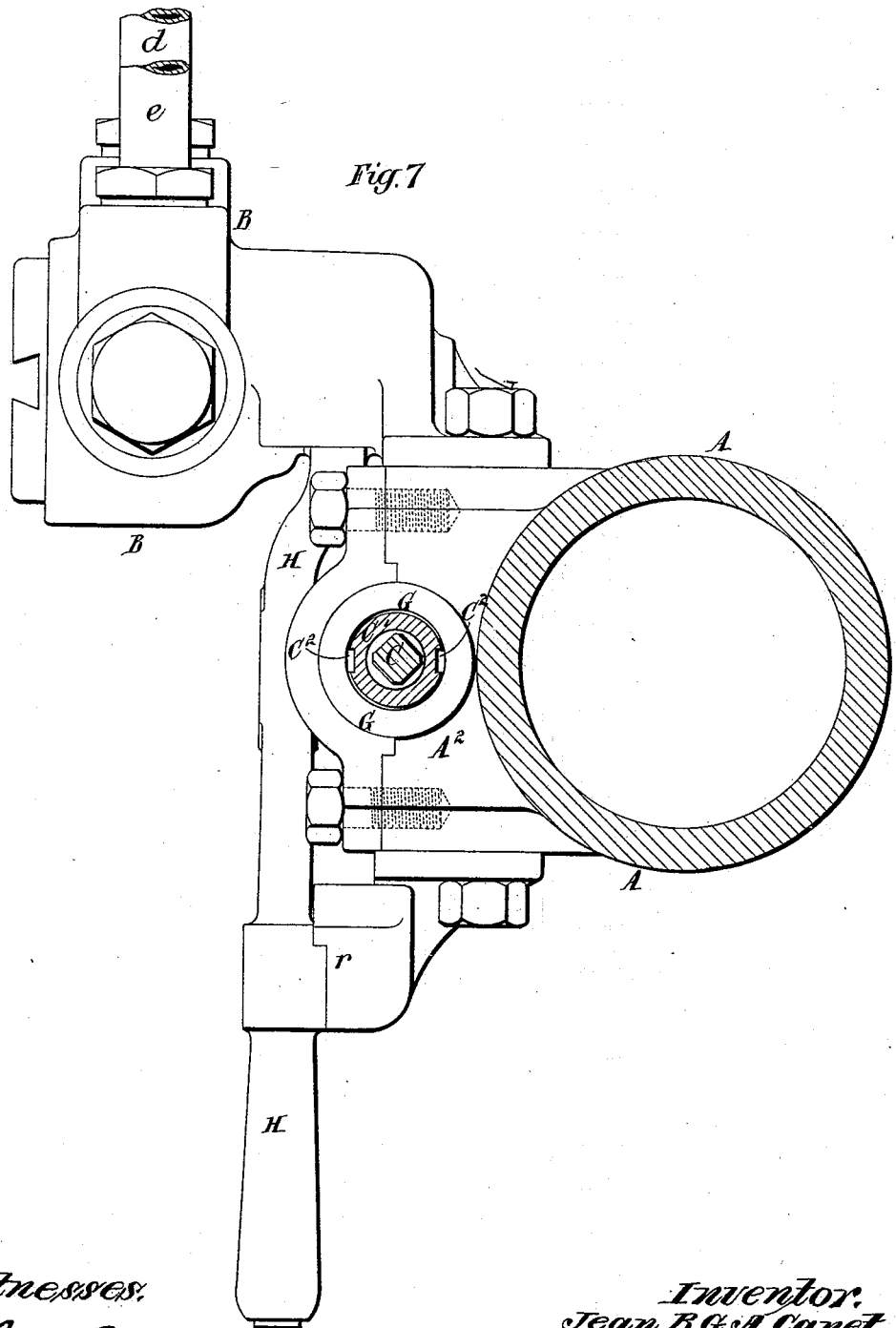

(No Model.) 6 Sheets—Sheet 6.
J. B. G. A. CANET.
CONTROLLING THE ACTION OF FLUIDS UNDER PRESSURE.
No. 425,657. Patented Apr. 15, 1890.
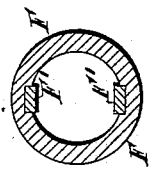
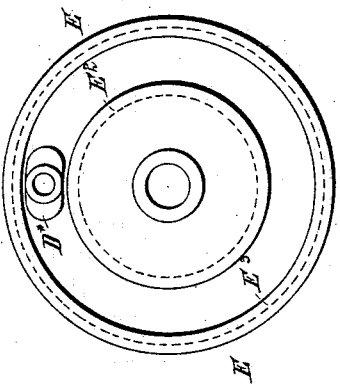
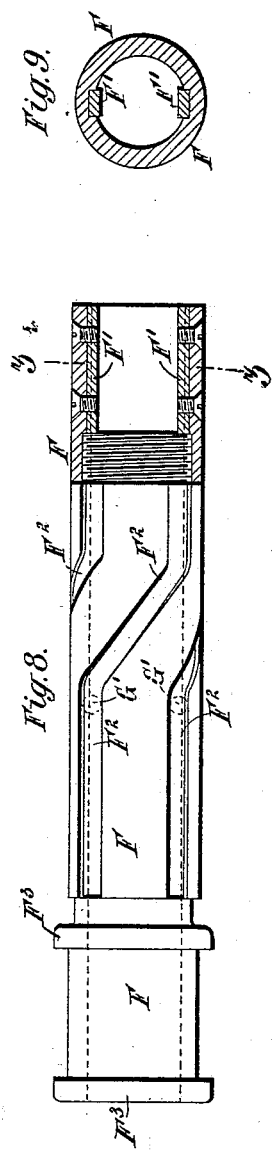
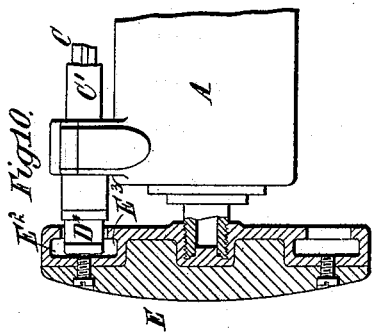
Witnesses.
J. A. Rutherford.
Robt. Everett.
Inventor.
Jean B. G. A. Canet,
By
James L. Norris.
Atty.

UNITED STATES PATENT OFFICE.

JEAN BAPTISTE GUSTAVE ADOLPHE CANET, OF PARIS, FRANCE, ASSIGNOR OF ONE-HALF TO SIR JOSEPH WHITWORTH & CO., (LIMITED,) OF MANCHESTER, ENGLAND.

CONTROLLING THE ACTION OF FLUID UNDER PRESSURE.

SPECIFICATION forming part of Letters Patent No. 425,657, dated April 15, 1890.

Application filed July 26, 1888. Serial No. 281,081. (No model.) Patented in France September 4, 1883, No. 157,389, and January 29, 1887, No. 184,518, and in England July 20, 1887, No. 10,180.

*To all whom it may concern:*

Be it known that I, JEAN BAPTISTE GUSTAVE ADOLPHE CANET, engineer, a citizen of the Republic of France, and a resident of Paris, France, have invented new and useful Improved Means for Effecting the Distribution and Controlling the Action of Fluids under Pressure in Hydraulic and other Apparatus, chiefly designed for facilitating the loading of guns, (for which I have obtained patents in the following countries: Great Britain, No. 10,180, dated July 20, 1887, and France, Nos. 157,389 and 184,518, dated September 4, 1883, (addition,) and January 29, 1887,) of which the following is a specification, reference being had to the accompanying drawings.

This invention relates to the distribution and control of fluids under pressure, and is designed to afford the means whereby the rammer of a gun or other apparatus to which to-and-fro motion is imparted may, after it has traversed the whole or any determined portion of its stroke or movement, be automatically arrested and caused to return to the point from which it started.

The main object of my invention is to provide for facilitating the loading of guns, and my improved apparatus may be advantageously used in connection with a telescopic rammer and in connection with apparatus for raising the ammunition into position behind the breech of the gun in line with the axis of the barrel, as described in the specification accompanying another of my applications for Letters Patent of the United States, filed on the 6th day of March, 1889, Serial No. 302,062.

In loading a gun by means of a hydraulic rammer the projectile is first inserted, the ramrod being caused to move to the forward end of its stroke, the length of which is so regulated that the projectile will by such movement be properly rammed home in the bore of the gun. Then by the same rammer the cartridge or powder-charge is pushed into the gun. It is important in this operation, in order to avoid the crushing of the powder, that the movement of the rammer shall be arrested at the exact moment when the charge has reached its proper position in the gun.

Now an important feature of my present invention is the provision I make for the automatic stoppage of the ramrod at the required moment when ramming home a cartridge or powder-charge and for the automatic return of the said ramrod to the rear end of its stroke.

My said invention, moreover, comprises other improvements hereinafter set forth.

In the accompanying drawings I have shown how my said invention may be conveniently and advantageously applied to a hydraulic telescopic rammer.

Figure 1 is a plan. Fig. 2 is a side elevation. Fig. 3 is a plan, partly in horizontal section, on the line $x\ x$, Fig. 2. Fig. 4 is a transverse section on the line $y\ y$, Fig. 3; and Fig. 5, a transverse section on the line $y'\ y'$, Fig. 3, showing details of construction. Fig. 6 is a transverse section on the line $x'\ x'$, Fig. 3. Fig. 7 is a transverse section on the line $x^2\ x^2$, Fig. 3. Fig. 8 is a side elevation partly in vertical central section; and Fig. 9, a transverse section on the line $z\ z$, Fig. 8, illustrating details of construction. Fig. 10 is a side elevation, partly in vertical central section, illustrating a modification of my said invention; and Fig. 11 is a rear elevation of the rammer-head shown in Fig. 10.

Like letters indicate corresponding parts throughout the drawings.

A is the cylinder of the telescopic rammer, which is fitted with pistons in any well-known or suitable manner. A pipe $a$ is connected with the forward end of the cylinder A, and is in communication with a pressure-main through the pipe or passage $b$, so that the outer or front surfaces of the said pistons are always subjected to the pressure of the liquid. A pipe or passage $c$ conducts the liquid from the pipe $b$ to a valve-box B, which communicates by a pipe $d$ with the rear end of the cylinder A, so that the liquid under pressure may be caused to act upon the inner or rear surfaces of the said pistons, as hereinafter described. An exhaust-pipe $e$ is, moreover, connected with the said valve-box B to permit the discharge of the liquid from the rear end of the cylinder A, as hereinafter set forth.

I provide reversing-gear, which is constructed as hereinafter described—that is to say:

C C' are the inner and outer portions of a telescopic rod, which is arranged in suitable bearings above and parallel with the rammer-cylinder A. The rod C is fitted within the hollow rod C', so that it may slide endwise therein, but must rotate therewith. The said rod C terminates in or has attached to its forward end either a hook or claw D, adapted to enter an annular groove E' in the head E of the ramrod, as shown in Figs. 1 and 2, or a T-shaped piece D*, adapted to enter grooves $E^2$ $E^3$ in the head E, as shown in Figs. 10 and 11. A sleeve F is fitted upon the outer rod C', and is provided internally with feathers or keys F', Figs. 8 and 9, which work in grooves $C^2$ in the said rod. This sleeve has exterior grooves $F^2$, which are partly rectilinear and partly helicoidal, and in which work pins, studs, or keys G', fixed in an outer sleeve G. The sleeves F G are carried in bearings A' $A^2$, formed with or firmly attached to the cylinder A. Endwise movement of the sleeve F is prevented by collars $F^3$, formed or fixed thereon one on each side of the bearing A'. The sleeve G is arranged to be moved to and fro by means of a lever H, which is fixed upon a short shaft H', carried in bearings in the valve-box B, and is formed with a slot $H^2$, through which projects a pin or stud $G^2$ on the sleeve G. This sleeve G is, moreover, formed with grooves $G^3$ and fitted to slide between guides $A^3$, which prevent rotation of the said sleeve.

$f$ is the admission-valve, and $g$ the discharge-valve, which are arranged in the valve-box B, to be operated as hereinafter described. Each of these valves is formed with a central chamber or cavity, and has fitted therein a small piston mounted upon a rod, which is formed or fixed on a slotted piece or stirrup provided with arms or projections, for the purpose hereinafter specified. The piston $i$ of the valve $f$ is constantly subjected to the pressure of the liquid in the pipe $c$, which has access to the chamber or cavity $h$ through small channels or passages $m$. The chamber or cavity $h'$ in the valve $g$ communicates with the discharge or exhaust pipe $e$ through small lateral channels or passages $m'$. Therefore there is no back-pressure of the liquid upon the piston $i$. Consequently when the lever H is moved in the direction indicated by the arrows in Figs. 1 and 3, and then released, the parts will be automatically moved back to the position shown in Fig. 3.

The admission and discharge valves $f$ $g$ are, in respect of the fluid-pressure, balanced or equilibrated in all positions, small channels or passages $n$ through the said valves keeping the spaces behind the same constantly in communication with the chamber B' of the box B. The valves $f$ $g$ are, moreover, acted upon by springs $o$ $o'$, which tend to keep the said valves upon their seats and to close the said valves. When the parts are in the position shown, the rear end of the cylinder is open to the discharge or exhaust through the pipes $d$ $e$, the valve $g$ being kept open and the valve $f$ closed.

Upon the shaft or fulcrum-pin H' of the lever H is mounted a fork or forked piece $p$, the two arms $p'$ $p^2$ of which are arranged to act upon the arms or projections $l'$ $l^2$ of the stirrup $l$, so that when the lever H is moved in the direction indicated by the arrow in Figs. 1 and 3 the arm $p'$ will act upon the projection $l'$, and when the said lever is moved in the reverse direction the arm $p^2$ will act upon the projection $l^2$. It will be seen that the action of the said fork $p$ upon the stirrup $l$, and consequently upon the distributing-valves, is the same whether the said lever be moved in one or the other direction. The lever H is provided with a spring stop or catch $q$, which is adapted to enter one or other of three notches in a segment $r$ to retain the said lever in its central position or at either extremity of its movement. The notch $r^2$ is, however, suitably formed to permit the disengagement of the said stop or catch therefrom by the force exerted upon the lever H by the rod C' through the medium of the sleeve G when a cartridge has been rammed home.

The operation of the apparatus is as follows—that is to say, for ramming home a projectile the lever H is moved in the direction indicated by the arrow in Figs. 1 and 3 into engagement with the notch $r'$, thus imparting endwise forward movement to the sleeve G, the studs or keys G' of which slide in the straight parts of the grooves $F^2$ from the position shown by dotted lines at G' in Fig. 8. Fluid under pressure is thus admitted to the rear end of the cylinder A, and the rear surfaces of the pistons being of larger area than the front surfaces thereof the ramrod moves forward, leaving behind it the rod C, the hook or claw D not being in engagement with the groove E'. When the projectile has been pushed home in the bore of the gun, the lever H is released and returns to the mean or neutral position. The fluid escapes from the rear end of the cylinder A through the pipes $d$ $e$, and the ramrod returns to the rear end of its stroke under the pressure of the fluid entering the cylinder through the pipe $a$. For ramming in a cartridge or powder-charge the said lever H is moved in the reverse direction to that indicated by the arrow in Figs. 1 and 3. The sleeve G is thus moved rearward, and the studs or keys G' thereof, traversing the helicoidal parts of the grooves $F^2$, cause the rods C C' to turn through an angle of about ninety degrees, so that the hook or claw D enters the groove E' in the head of the ramrod, and as soon as the forward motion of the said ramrod commences the said rods C C' are moved along therewith. The rods C C' move with the said ramrod until a buffer C³ at the rear extremity of the rod C' strikes the sleeve G and moves the same forward. The sleeve G is thus caused to move the actuating-lever H back to its neutral or central position and open the exhaust $e$. Then, under the pressure acting constantly on the pistons of the rammer through the pipe $a$, the said ramrod is again moved rearward to the end of its stroke. If the charge is formed of two or more cartridges or sections, the first cartridge is placed upon the loading-tray and rammed into the gun, and the other cartridge or cartridges are placed behind it and rammed in until the first cartridge occupies its proper position in the said chamber; or all the cartridges or sections of the powder-charge may be rammed in together.

The arrangement of the distributing and controlling valves as hereinbefore described allows the distribution to be effected without much effort. Moreover, it insures the automatic return of the lever H to the exact position for the discharge or exhaust under the action of the pressure which is constantly exerted upon the small piston $i$.

The length of the stroke or movement of the ram or piston before it is arrested may be varied by placing suitable stops upon the rod C' in front of the aforesaid buffer C³; or the said buffer may be made adjustable on the said rod for this purpose.

In the apparatus shown in the drawings the passage $b$ extends through the pivot upon which the rammer turns. A bearing-surface A⁴ is provided for supporting the forward end of the rammer upon a suitable bracket when it is in the loading position. Handles A⁵ are, moreover, provided for facilitating the turning of the rammer upon its pivot and for the securing of the said rammer when not in use.

It is obvious that the above-described improved means for effecting the distribution and controlling the action of fluids under pressure may be advantageously applied to hydraulic and other apparatus in which it is necessary that a ram or piston should, after it has performed the whole or any determined portion of its stroke or travel, be automatically arrested and caused to return to its starting-point. For instance, assuming that E in the drawings is the ram of a slotting-machine or a planing-machine worked by hydraulic power, and C' is a rod or bar connected with the said ram by means similar to those illustrated, it is obvious that the rod C' can be made to operate or control the distribution of the fluid substantially as above described with reference to the rammer.

What I claim is—

1. The combination, with a ram or piston arranged to be moved to and fro by fluid-pressure, of valves for distributing and controlling the flow of the fluid, a lever for actuating the said valves, and a sliding rod or bar adapted to engage with the said ram or piston, and provided with a projection, collar, or head which, when the said ram or piston has traversed a predetermined portion of its stroke or movement in one direction, will act upon the said lever, and thus automatically operate the said valves to reverse the motion of the said ram or piston, for the purposes above specified.

2. The combination, with a ram or piston arranged to be moved to and fro by fluid-pressure, of valves for distributing and controlling the flow of the fluid, a lever for actuating the said valves, a sliding rod or bar adapted to engage with the said ram or piston, and provided with a projection, collar, or head which, when the said ram or piston has traversed a predetermined portion of its stroke or movement in one direction, will act upon the said lever, and thus automatically operate the said valves to reverse the motion of the said ram or piston, springs acting upon the said valves and tending to press them against their seats, and pistons working in chambers or cavities in the said valves, which chambers or cavities are in communication with the pressure main and exhaust, respectively, for the purposes above specified.

3. The combination, with a ram or piston working in a cylinder, one end of which is constantly in communication with the pressure-main, of a valve-box connected by pipes or passages with the pressure main and exhaust and with the other end of the said cylinder, valves in the said box for controlling the flow of fluid through the admission and exhaust pipes or passages, a lever for actuating the said valves to open the admission-pipe and close the exhaust-pipe, and a sliding rod or bar adapted to engage with the said ram or piston, and provided with a projection, collar, or head which, when the said ram or piston has traversed a predetermined portion of its stroke or movement, will act upon the said lever, and thus automatically return the said valves to their normal or neutral position, substantially as and for the purposes set forth.

4. The combination, with a ram or piston arranged to be moved to and fro by fluid-pressure, of distributing-valves, a lever for actuating said valves, a hollow rod fitted to turn in suitable bearings and provided at one end with a buffer or collar, an inner rod which is free to slide in the said hollow rod, but is rotatively connected therewith, the said rods being parallel with the said ram or piston, a sleeve keyed upon the said hollow rod and formed with longitudinal and helical grooves, an outer sleeve which is free to slide but is restrained from rotation upon the grooved sleeve and is provided with a stud or projection working in the said grooves, the said outer sleeve being connected with the said valve-operating lever, so that when the said lever is moved in one direction the said rods will be turned about their axis and a claw or projection on the inner rod caused to engage with the ram or piston, and the said rods will move with the said ram or piston until the said buffer or collar strikes the outer sleeve, and thus automatically operates the said lever and valves, for the purposes above specified.

5. The combination, with a ram or piston arranged to be moved to and fro by fluid-pressure, of a valve-box B, connected by pipes or passages with the pressure main and exhaust, valves $f\,g$, for distributing and controlling the flow of the fluid, pistons $i\,i'$, working in chambers or cavities in the said valves, a stirrup $l$, connecting the said pistons and provided with arms $l'\,l^2$, and a lever H, which is pivoted at H' and is provided with studs or projections $p\,p'$, for acting upon the said arms, and which will be operated by the said ram or piston when the latter has traversed a predetermined portion of its stroke or movement in one direction, substantially as and for the purposes specified.

6. The combination of a cylinder, a ram or piston working therein, and one side of which is constantly subjected to fluid-pressure, a valve-box B, connected by pipes or passages $c\,e$ with the pressure main and exhaust and by a pipe or passage $d$ with the space in the said cylinder on the other side of the said ram or piston, valves $f\,g$, for controlling the flow of the fluid through the said pipes $c\,e$, springs $o\,o'$, acting upon the said valves and tending to press them against their seats, pistons $i\,i'$, working in chambers or cavities in the said valves, which chambers or cavities are in communication with the pressure main and exhaust, respectively, a stirrup $l$, connecting the said pistons and provided with the arms $l'\,l^2$, and a lever H, pivoted at H' and provided with studs or projections $p'\,p^2$, for acting upon said arms, substantially as and for the purposes set forth.

7. The combination, with a ram or piston arranged to be moved to and fro by fluid-pressure, of the distributing-valves $f\,g$, the actuating-lever H, the telescopic rods C C', the inner one of which is adapted to engage with the ram or piston, a sleeve F, keyed upon the outer rod C' and formed with longitudinal and helical grooves, a sleeve G, connected with the said actuating-lever and provided with studs working in the said longitudinal and helical grooves in the sleeve F, and a buffer or collar on the rod C', all substantially as and for the purposes set forth.

8. The combination, with a ram or piston, of a valve-box B, having inlet and outlet apertures $c\,d\,e$, as described, loaded valves $f\,g$, provided with the pistons $i\,i'$, open, respectively, to the supply and exhaust passages, the stirrup $l'$, connected with the said pistons, the actuating-lever H, provided with the forked piece $p$, engaging with the said stirrup, the telescopic rods C C', the inner of which is adapted to engage with the ram and the outer of which is provided with a buffer or collar $C^3$, a sleeve F, keyed to the telescopic rod C', so that while free to slide thereon it must rotate therewith, and formed with longitudinal and helical grooves, and a sleeve G, connected with the said actuating-lever and provided with studs working in the said longitudinal and helical grooves in the said sleeve F, all substantially as and for the purposes set forth.

9. The combination, with a ram or piston, of a valve-box B, having inlet and outlet apertures $c\,d\,e$, as described, loaded valves $f\,g$, provided with the pistons $i\,i'$, open, respectively, to the supply and exhaust passages, springs $o\,o'$, acting upon the said valves, the stirrup $l$, connected with the said pistons, the actuating-lever H, provided with the forked piece $p$, engaging with the said stirrup, the telescopic rods C C', the inner of which is adapted to engage with the said ram and the outer of which is provided with a buffer or collar $C^3$, a sleeve F, keyed to the telescopic rod C', so that while free to slide thereon it must rotate therewith, and formed with longitudinal and helical grooves, and a sleeve G, connected with the said actuating-lever and provided with studs working in the said longitudinal and helical grooves in the said sleeve F, all substantially as and for the purposes set forth.

10. The combination, with a ram or piston, of the distributing and controlling valves $f\,g$, the pistons $i\,i'$, the stirrup $l$, the forked piece $p$, the actuating-lever H, the sleeve G, connected with said lever and provided with studs G', the sleeve F, having the rectilinear and helicoidal grooves in which said studs slide, and the telescopic rods C C', the part C' of which is keyed in said sleeve F, so that it will rotate therewith, but can slide therein, and is adapted to engage with the head of the said ram or piston, all substantially as and for the purposes set forth.

In testimony whereof I have hereunto signed my name in the presence of two subscribing witnesses.

JEAN BAPTISTE GUSTAVE ADOLPHE CANET.

Witnesses:
 ROBT. M. HOOPER,
 CH. F. THIRION.